United States Patent
Kunapuli et al.

(10) Patent No.: US 12,201,939 B2
(45) Date of Patent: Jan. 21, 2025

(54) METAL-ORGANIC FRAMEWORK (MOF) MATERIALS FOR SUPERIOR REFRIGERANT DRYING PERFORMANCE

(71) Applicant: Parker-Hannifin Corporation, Cleveland, OH (US)

(72) Inventors: Raghujit Prasad Kunapuli, Chesterfield, MO (US); Debasis Banerjee, Ellisville, MO (US); Praveen K. Thallapally, Richland, WA (US); Michael A. Sinwell, Richland, WA (US); Bernard P. McGrail, Pasco, WA (US)

(73) Assignee: Parker-Hannifin Corporation, Cleveland, OH (US)

( * ) Notice: Subject to any disclaimer, the term of this patent is extended or adjusted under 35 U.S.C. 154(b) by 366 days.

(21) Appl. No.: 17/635,112

(22) PCT Filed: Aug. 27, 2020

(86) PCT No.: PCT/US2020/048082
§ 371 (c)(1),
(2) Date: Feb. 14, 2022

(87) PCT Pub. No.: WO2021/041594
PCT Pub. Date: Mar. 4, 2021

(65) Prior Publication Data
US 2022/0274053 A1    Sep. 1, 2022

Related U.S. Application Data

(60) Provisional application No. 62/893,421, filed on Aug. 29, 2019.

(51) Int. Cl.
*B01D 53/06* (2006.01)
*B01D 53/26* (2006.01)
(Continued)

(52) U.S. Cl.
CPC ............ *B01D 53/28* (2013.01); *B01D 53/06* (2013.01); *B01D 53/261* (2013.01);
(Continued)

(58) Field of Classification Search
CPC ........ B01D 53/02; B01D 53/04; B01D 53/06; B01D 53/28; B01D 53/261;
(Continued)

(56) References Cited

U.S. PATENT DOCUMENTS

| | | | |
|---|---|---|---|
| 3,815,752 A | 6/1974 | Hoffman et al. | |
| 5,440,898 A * | 8/1995 | Starr | B01J 20/28004 34/80 |

(Continued)

FOREIGN PATENT DOCUMENTS

| | | |
|---|---|---|
| EP | 2985075 A1 | 2/2016 |
| JP | H10 111034 A | 4/1998 |

(Continued)

OTHER PUBLICATIONS

International Search Report and Written Opinion of the International Searching Authority for corresponding International Patent Application No. PCT/US2020/048082, mailed Nov. 26, 2020.

(Continued)

*Primary Examiner* — Frank M Lawrence, Jr.
(74) *Attorney, Agent, or Firm* — Renner, Otto, Boisselle & Sklar, LLP

(57) ABSTRACT

A filter-drier unit for a refrigerant includes an exterior housing formed of a hard material, and a desiccant material supported within the exterior housing and being formed of a metal-organic framework material having inorganic metal ions and bridging ligands that link the metal ions. The metal-organic framework has a three-dimensional perma- (Continued)

nently porous structure that has at least one chemically tunable characteristic, such as pore size, pore volume, and surface area.

20 Claims, 11 Drawing Sheets

(51) Int. Cl.
  *B01D 53/28* (2006.01)
  *B01J 20/22* (2006.01)
  *B01J 20/28* (2006.01)
  *F25B 43/00* (2006.01)
(52) U.S. Cl.
  CPC ......... *B01J 20/226* (2013.01); *B01J 20/2803* (2013.01); *B01J 20/28061* (2013.01); *B01J 20/2808* (2013.01); *B01J 20/28083* (2013.01); *F25B 43/003* (2013.01); *B01D 2253/204* (2013.01); *B01D 2253/306* (2013.01); *B01D 2253/31* (2013.01)
(58) Field of Classification Search
  CPC ........ B01D 2253/204; B01D 2253/306; B01D 2253/31; B01D 2259/4508; B01J 20/226; B01J 20/2803; B01J 20/28061; F25B 43/003
  USPC .................. 210/282; 95/117; 96/108, 117.5; 502/501
  See application file for complete search history.

(56) References Cited

U.S. PATENT DOCUMENTS

| | | | |
|---|---|---|---|
| 5,648,508 A | 7/1997 | Yaghi | |
| 6,835,235 B2* | 12/2004 | Pilgram | F25B 43/003 55/491 |
| 8,507,399 B2 | 8/2013 | Hwang et al. | |
| 9,951,980 B2 | 4/2018 | Reeves et al. | |
| 11,253,838 B2* | 2/2022 | Weston | B01D 53/02 |
| 2003/0140791 A1* | 7/2003 | Lacey | F25B 43/003 96/108 |
| 2006/0099398 A1* | 5/2006 | Hesse | B01J 20/3035 264/109 |
| 2006/0210458 A1 | 9/2006 | Mueller et al. | |
| 2009/0263621 A1 | 10/2009 | Chang et al. | |
| 2011/0011805 A1* | 1/2011 | Schubert | B01J 20/0233 210/689 |
| 2013/0283846 A1 | 10/2013 | Baumann et al. | |
| 2013/0283849 A1 | 10/2013 | Baumann et al. | |
| 2015/0094202 A1 | 4/2015 | Dolan et al. | |
| 2016/0084541 A1 | 3/2016 | Aguado et al. | |
| 2018/0333696 A1 | 11/2018 | Burckhart et al. | |
| 2020/0282379 A1* | 9/2020 | Mulet | B01J 20/28011 |

FOREIGN PATENT DOCUMENTS

| | | | |
|---|---|---|---|
| WO | 2007090864 A1 | 8/2007 | |
| WO | 2014028574 A2 | 2/2014 | |
| WO | 2017/218346 A1 | 12/2017 | |
| WO | WO-2020034008 A1 * | 2/2020 | ............. B01D 53/02 |

OTHER PUBLICATIONS

Hiroyasu Furukawa et al., "Water Adsorption in Porous Metal-Organic Frameworks and Related Materials", Journal of the American Chemical Society, vol. 136, No. 11, Mar. 19, 2014, pp. 4369-4381.
Written Opinion of the International Preliminary Examining Authority for corresponding International Patent Application No. PCT/US2020/048082, mailed Sep. 13, 2021.
International Preliminary Report on Patentability for corresponding International Patent Application No. PCT/US2020/048082, mailed Dec. 8, 2021.

* cited by examiner

METAL-ORGANIC FRAMEWORK (MOF) MATERIALS FOR SUPERIOR REFRIGERANT DRYING PERFORMANCE

RELATED APPLICATIONS

This application is a national phase of International Application No. PCT/US2020/048082 filed Aug. 27, 2020, which claims priority of U.S. Provisional Application No. 62/893,421 filed Aug. 29, 2019, which are incorporated herein by reference in their entirety.

STATEMENT REGARDING FEDERALLY SPONSORED RESEARCH OR DEVELOPMENT

The present invention was made with Government support under Strategic Partnership Project Agreement No. 67545 with Battelle Memorial Institute, Pacific Northwest Division. The Government has certain rights in the invention.

FIELD OF INVENTION

The present invention relates to filter-driers, and more particularly, to filter-drier units having desiccants for refrigerant drying.

BACKGROUND

Filter-driers may be used in air conditioning, heat pump, and refrigeration system applications, or in other applications that require moisture removal, contaminant filtration, and acid removal. A filter-drier unit is used to both adsorb system contaminants and provide filtration in a refrigeration and air-conditioning system. Contaminants that may be present in the refrigeration and air-conditioning system include water, acid, copper oxides, metal chips, and wax-like compounds. Water may be introduced into the refrigerant from trapped air due to improper evacuation, system leaks, motor windings, and the improper handling of lubricants. Water in the system is disadvantageous in that the water may cause freezing and corrosion of metallic components within the system or may cause chemical reactions that form undesirable organic acids within the system.

Prior attempts to remove moisture in refrigeration systems include using a filter-drier having a desiccant material that is configured to contact the contaminated refrigerant. Examples of conventional desiccant materials include a zeolite molecular sieve, alumina, silica gel and the like. These materials intake water molecules by means of physical adsorption or molecular sieving. In the case of molecular sieving, the material adsorb water molecules by means of size exclusion. The crystal structure has cavities or pores which permits molecules, such as water molecules, to be adsorbed, and enables larger molecules, such as refrigerant, lubricant, and acids to pass. However, standard desiccant materials such as molecular sieve has limitation such as chemical tunability and as such enhancing a property such as increase in water adsorption capacity is not possible. Another disadvantage is that filter-driers may not be economical to manufacture using molecular sieve desiccant with low water capacity due to the size of the filter-drier exterior housing required to accommodate the desiccant material

SUMMARY OF INVENTION

The present invention is directed towards a filter-drier unit that is arranged in a refrigeration system or air conditioning system for moisture removal, contaminant filtration, and acid removal. The filter-drier unit has an outer housing formed of a hard material that supports desiccant material formed of a metal-organic framework (MOF), a next-gen solid state material formed by metal ions or metal ion clusters connected by organic linkers with three-dimensional permanently porous structure with a chemically tunable pore size, surface area and pore volume.

Forming the desiccant material of a MOF is advantageous in that characteristics of the desiccant material may be adjusted by chemically tuning the metal ions and the bridging ligands. The characteristics may be physical or mechanical properties such as surface area, pore volume, particle size distribution, density, compressibility, stiffness, strength, thermal expansion, thermal conductivity, and water adsorption capacity. Chemical tuning may include replacing or modifying the bridging ligands to adjust the pore surface chemistry and enhance the water adsorption capacity or selectivity of the desiccant in a particular application. MOFs provide an increased water adsorption capacity of the filter-drier unit due to the high density of open metal sites and the large surface area of the MOF as compared with conventional desiccant materials.

The filter-drier unit having desiccant material formed of a molded core material, loose-bead material, or monolith MOF material improves the operation and efficiency of the filter-drier unit used for refrigerant. Due to the improved efficiency, the overall size and weight of the housing of the filter-drier unit may be optimized. The size of the desiccant material and the size of the outer housing of the filter-drier unit may both be reduced as compared with conventional filter-driers. Using the MOF desiccant material may also enable the filter-drier unit to have fewer components, such as fittings, paint, joints, and cooling fixtures. Reducing the size of the filter-drier unit and eliminating the use of additional components advantageously provides for a filter-drier unit that is more efficient and less costly to manufacture as compared with conventional filter-driers.

According to an aspect of the invention, a filter-drier unit for refrigerant includes an exterior housing formed of a hard material, and a desiccant material supported within the exterior housing and being formed of a metal-organic framework material having inorganic metal ions and bridging ligands that link the metal ions. The metal-organic framework has a three-dimensional permanently porous structure that has at least one chemically tunable characteristic.

According to another aspect of the invention, a method of forming a filter-drier unit for a refrigerant in a refrigeration loop includes providing an exterior housing formed of a hard material, forming metal-organic framework type desiccant material having inorganic metal ions and bridging ligands that link the metal ions, with the metal-organic framework having a three-dimensional permanently porous structure, and arranging the desiccant material within the exterior housing.

According to still another aspect of the invention, a method of filtering a refrigerant in a refrigeration loop includes passing at least a portion of a mixed stream of the refrigerant and other media over a desiccant material formed of a metal-organic framework material having a three-dimensional permanently porous structure, with the metal-organic framework material being one of a MOF-74-M material, an HKUST-1 material, a UiO-66 material, an aluminum fumarate material, or a mixed-metal material that includes divalent, trivalent, or tetravalent metals ions, and capturing a predetermined medium from the mixed stream to separate the medium from the refrigerant using the desiccant material.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

Figure 1:
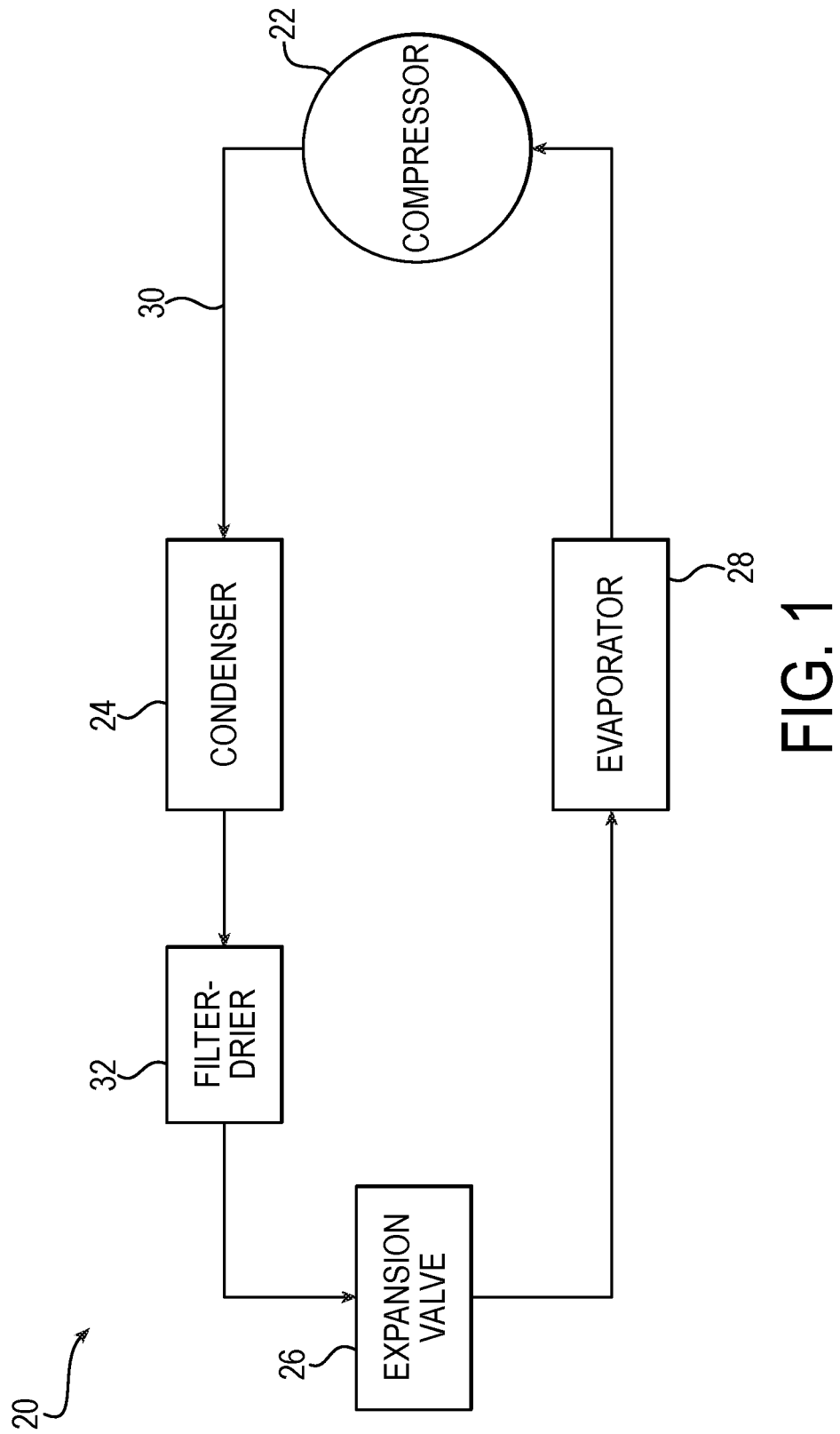
FIG. 1 is a schematic drawing showing a refrigerant fluid conduit loop that has a filter-drier unit configured to receive refrigerant.

Aspects of the present invention relate to filter-driers used in air-conditioning, heat pump, and refrigeration system applications, and particularly to a filter-drier unit having desiccants. Referring first to FIG. 1, a schematic drawing of an exemplary refrigeration system 20 is shown. The exemplary refrigeration system 20 includes a compressor 22, a condenser 24, an expansion valve 26 and an evaporator 28 that are arranged along a refrigerant fluid conduit loop 30. During normal operation, a refrigerant flows continuously along the refrigerant fluid conduit loop 30. The refrigeration system 20 further includes a filter-drier unit 32 through which the refrigerant passes. The filter-drier unit 32 may be arranged downstream of the condenser 24 along the refrigerant fluid conduit loop 30 for receiving compressed air. In other exemplary applications, the filter-drier unit 32 may be suitable for use along other portions of the refrigerant fluid conduit loop 30.

Figure 4:
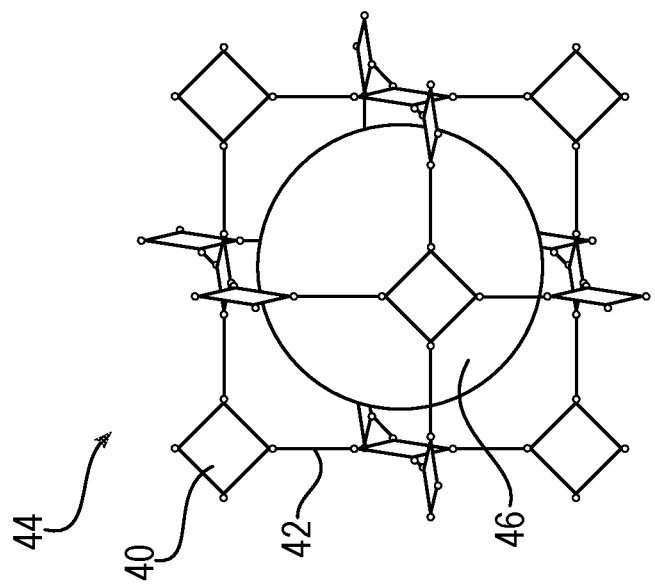
FIG. 4 is a drawing showing a unit cell crystal structure of a metal-organic framework (MOF) material of the desiccant material of FIG. 3.
Figure 3:
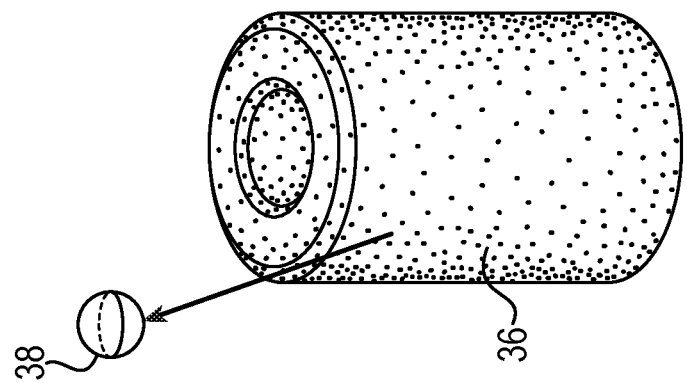
FIG. 3 is a drawing showing a perspective view of a desiccant material of the filter-drier unit of FIG. 2.
Figure 2:
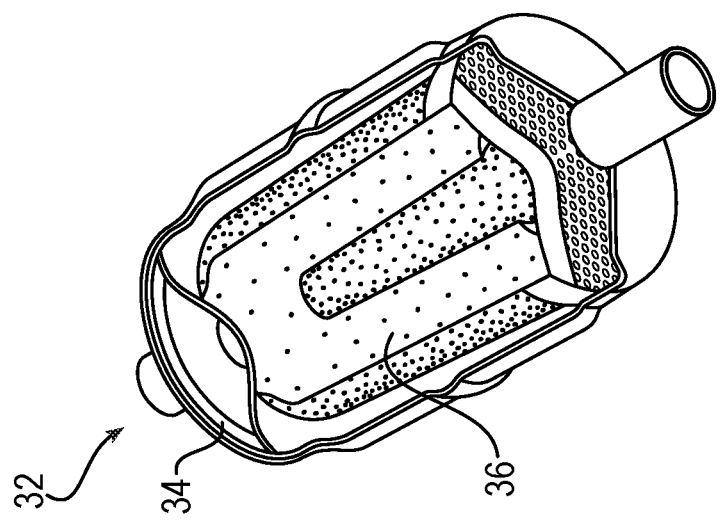
FIG. 2 is a drawing showing a cross-sectional view of a filter-drier unit in accordance with exemplary embodiments of the present application.

Referring now to FIGS. 2-4, the filter-drier unit 32 includes an exterior housing 34 that is formed of a hard material. The exterior housing 34 supports a desiccant material 36 configured for contact with the refrigerant for removing contaminants from the refrigeration system, such as moisture which may cause freezing and corrosion of components within the refrigeration system 20, or react with lubricants of the system to form undesirable organic acids that may adversely affect operation of the components. The filter-drier unit 32 is effectively used for drying a refrigerant. The desiccant material 36 may be formed as a solid body, as shown in FIG. 3. The solid body may have any suitable shape that is configured to be arranged within the exterior housing 34 of the filter-drier unit 32 with a minimal volume defined between the body and the exterior housing 34. For example, the solid body may be formed to have a cylindrical or spherical shape.

The desiccant material 36 is a metal-organic framework (MOF) material that to have any shape using any suitable manufacturing processes. The desiccant material 36 may be formed of a molded core material, loose-bead material, or monolith MOF material. Examples of suitable manufacturing processes include pressing, compounding, pelletization, tableting, extrusion, coextrusion, foaming, spinning, coating, wet granulation, spraying, spray drying or any combination thereof. Prior to forming the solid body of the desiccant material 36, the MOF may be manufactured to have shaped bodies that are formed as pellets 38, beads, or other cylindrical or spherical shapes, as schematically shown in FIG. 3. The pellets 38 may have sizes between 0.1 millimeters and 30 millimeters and are packed together to form the solid body of the desiccant material 36. Other shapes and manufacturing processes may be suitable, and the shapes and manufacturing processes may be dependent on the application.

As shown in FIG. 4, the MOF has a plurality of inorganic metal ions or metal ion cluster 40 and organic linkers or bridging ligands 42 that connect or link the metal ions or metal ion cluster 40. The MOF may be a mixed metal or mixed ligand MOF. The desiccant material 36 is formed of a plurality of MOF unit cells 44 that each define a void or pore 46 such that the MOF has a three-dimensional permanently porous structure. For example, the surface area of the MOFs may be greater than 50 $m^2/g$ and the pore sizes may be greater than 3 angstroms. In exemplary applications, the pore sizes may be between 0.3 and 10 nanometers. The pores may be uniformly sized, or the pores may vary in size depending on the MOF material for a particular application. The open metal sites on the pore surface adsorb water molecules from the refrigerant which enables a high water uptake at a low concentration or partial pressure when separating the water. The filter-drier unit 32 having MOF desiccant material may be suitable for use with any organic liquid refrigerant. Due to the high stability of MOF, the filter-drier unit 32 may be suitable for use with non-polar fluorinated hydrocarbon based refrigerants or any suitable type of refrigerant blend.

Using the MOF is advantageous in that the MOF is inert to the refrigerant and has a higher selectivity for water over refrigerant, or water adsorption capacity, as compared with conventional desiccant materials such as zeolites. The MOF may have a higher selectivity due to the chemical tunability of MOFs. The metal ions 40 and bridging ligands 42 are variable to adjust the pore volume of the MOF and obtain different chemical and mechanical properties for particular applications. For example, the bridging ligands 42 may be replaced or modified to change a pore surface chemistry of the MOF such that the MOF is chemically tunable in contrast to conventional porous materials. The chemical interactions within MOFs are variable to adjust at least one characteristic of the desiccant material, such as the physical properties and mechanical properties of the MOFs.

Examples of properties of the MOF that are adjusted by chemically tuning include crystallinity, surface area, pore volume, particle size distribution, density, compressibility, stiffness, strength, thermal expansion, thermal conductivity, and water adsorption capacity. For example, the MOF can be functionalized with polar groups (e.g. hydroxyl, sulfonate, acid, phosphate, etc.) on a pore surface of an existing MOF to enhance the water adsorption capacity of the material. Other physical and mechanical properties may also be adjustable and the MOF may be infinitely tunable due to the possible variations in metal ions or metal ion clusters 40 and bridging ligands 42. Being able to tune the MOF results in a filter-drier unit 32 with a desiccant material 36 having a surface area, an increased water uptake weight percent, and an increased water adsorption capacity as compared with a filter-drier having conventional desiccant materials.

The MOF materials may include any suitable metal component such as nickel, copper, magnesium, or zinc, and any combinations thereof. Other suitable metal components include iron, aluminum, magnesium, vanadium, manganese, cobalt, scandium, yttrium, titanium, zirconium, hafnium, niobium, tantalum, calcium, chromium, molybdenum, tungsten, technetium, rhenium, ruthenium, osmium, iridium, palladium, platinum, silver, gold, mercury, strontium, barium, gallium, indium, thallium, silicon, germanium, tin, lead, antimony, lanthanide, or bismuth, and any combination thereof. Other metal materials may be suitable. Divalent, trivalent, tetravalent, pentavalent, or hexavalent metal ions may also be suitable.

Figure 5:
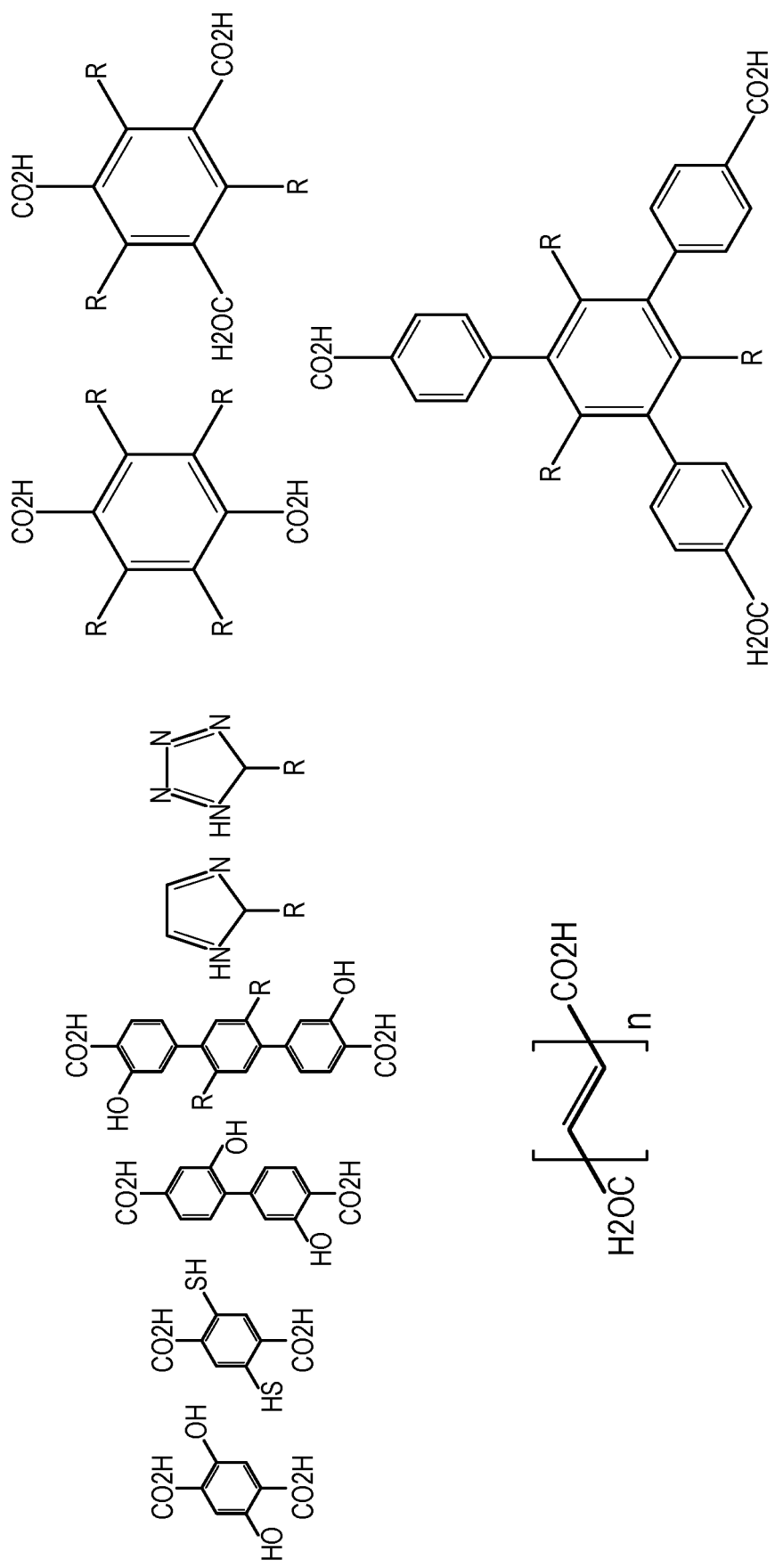
FIG. 5 shows the chemical structure of representative organic linkers for building various MOFs.

With reference to FIG. 5, the organic building blocks in MOFs can be with and without functionalized 1,4-benezene-dicarboxylate, or 1,3,5-benezene tricarboxylate, or 1,2,4,5-benezene tetracarboxylate, or substituted imidazolates or fumate, oxalate, etc., and various combinations thereof. As shown in FIG. 5, R may be H, $CH_3$, CHO, $-SO_3$, OH, COOH, POSH, etc., and n may be between 0 to 10. The MOF materials suitable for use may consist of mixed metals containing divalent, trivalent oxidation states The organic linker has a functional group capable of coordination. Examples of functional groups that can be coordinated with these metal ions include but are not limited to, carbonic acid ($-CO_3H$), anionic form of carbonic acid ($-CO_3^-$), carboxyl anion group of carboxylic acid, amino group ($-NH_2$), imino group, hydroxyl group ($-OH$), amido group ($-CONH_2$), sulfonic acid group ($-SO_3H$), anionic form of sulfonic acid ($-SO_3$), cyanide ($-CN$), nitrosyl ($-NO$) pyridine, and so on. The organic ligand can be dihydroxyterephthalate and its derivatives. In a non-limiting example this may include, dihydroxyterephthalate having, chloro, bromo, iodo, fluoro, cyano, sulphonato, amino, aldehyde, carbamide and so on. Similarly, organic building blocks can be functionalized with di-, tri-, tetra-, pentaterephthalate containing at least one or more functional groups such as nitro, amino, bromo, chloro, iodo, amino and so on, as shown in FIG. 5. In one embodiment, porous metal organic framework materials having chemical formula $M_3X$ $(H_2O)_2O[C_6Z_{4-y}Z'_y(CO_2)_3$ (M=Cu, Fe, Ca, Mg, Zn, Ni, Cr, Mn, V, Al, Mg, Ca, Ti; X=Cl, Br, I, F, or OH; Z or Z'=H, $NH_2$, Br, I, $NO_2$ 0<y<4) or a hydrate may be utilized. Other embodiments of the porous metal organic framework of chemical formula include $M_3X(H_2O)_2O[C_6Z_{3-y}Z'_y(CO_2)_3]_2$ (M=Cu, Fe, Zn, Ni, Cr, Mn, V, Al, Mg, Ca, Ti; X=Cl, Br, I, F, or OH; Z or Z'=H, $NH_2$, Br, I, $NO_2$ 0<y<4). Other molecular formulas may be represented as $M_3OX_{1-y}(OH)_y$ $[C_6H_3-(CO_2)_3]_2$ (0<y<1; M=Cu, Fe, Mn, Cr,V, Al, Ti, Zr, or Mg, X=Cl, Br, I, F, $NO_2$, $NH_2$, CHO. $M_3X_{1-y}(OH)_y$ $(H_2O)_2$ $O[C_6H_4(Co_2)_2]_3$; (0<y<1; M=Cu, Zn, Al, Mg, Fe, Ge, Ru, Rh, Mn, Ni; X=Cl, Br, I, F, etc). Another chemical formula of porous MOFs with hydrate is represented as $M_3O(H_2O)_2X_{1-y}(OH)_y[C_6H_3-(CO_2)_3]_2 \cdot nH_2O$ (0<y<1; (M=Cu, Fe, Mn, Cr, V, Al, Ti, Zr, or Mg, X=Cl, Br, I, F, NO=, $NH_2$, CHO, 0.1<n<150) $M_3X_{1-y}(OH)_y(H_2O)_2O$ $[C_6H_4(CO_2)_2]_3 \cdot nH_2O$ (M=Cu, Fe, Mn, Cr, V, Al, Ti, Zr, or Mg, X=Cl, Br, I, F, $NO_2$, $NH_2$, CHO, 0.1<n<150).

The bridging ligands 42 that are connected between the metal ions 40 may be formed of any suitable materials. The bridging ligands 42 may include any functional group that is capable of coordination with the metal ions 40, such as carbonic acid, anionic form of carbonic acid, carboxyl anion group of carboxylic acid, amino group, imino group, hydroxyl group, amido group, sulfonic acid group, anionic form of sulfonic acid, cyanide, and nitrosyl pyridine. Many other materials may be suitable for the bridging ligands 42. The ligands 42 may include at least two sites for coordination, such as bidentate, tridentate, tetradentate, pentadentate, and hexadentate ligands.

In contrast to conventional desiccant materials, the MOF may be formed without a binder material or binder agent while maintaining the desired properties of the desiccant material. In other exemplary embodiments, the MOF may include any suitable binder material or binder agent to enhance the strength of the MOF. Using MOF material is advantageous in that a greater variety of binder materials may be compatible with MOF material as compared with conventional desiccant materials that require binders. Any binder material that is refrigerant-lubricant-additive compatible may be suitable. Examples of suitable binder materials include clay or suitable polymer binders, such as polyamide (nylon), novolac resin, thermoset or thermoplastic binders, etc. The MOF may be formed of any amount of binder, such as an amount that is between 1 and 50% of the total amount of the MOF material. In an exemplary embodiment in which the binder is polyacrylic acid, the MOF may be formed of approximately 5% binder material.

In exemplary applications, the MOF may be blended with an activated alumina to prevent corrosion of components in the system. For example, a refrigerant may be stable but acid such as hydrochloric acid or hydrofluoric acid may form during certain conditions, or oxidation reactions of lubricant may occur in the system. Using activated alumina that is blended with the MOF is advantageous for acid capacity of the filter-drier unit 32 as desirable for particular applications. For example, the MOF may include between 5 and 90% alumina.

Any suitable MOF may be used as the desiccant material of the filter-drier unit 32. An exemplary suitable MOF includes $M_2DOBDC$, also known as MOF-74-M, where M is nickel, cobalt, magnesium or zinc, and DOBDC is 2,5-dioxido-1,4-benzenedicarboxylate. DOBDC is the organic bridging ligand of the material. Another suitable MOF includes a copper benzene-1,3,5-tricarboxylate with copper open metal sites, which is also known as MOF-199, Cu-BTC, or HKUST-1. Still another suitable MOF includes aluminum fumarate. The MOF-74-M material may have uniform honeycomb pores with diameters of about 8 angstroms, and the HKUST-1 material may have at least three different sets of pores with radii ranging between 4 and 10 angstroms. Many other types of MOFs may be suitable. Any MOF having a surface area that is greater than 50 $m^2/g$ may be suitable. A low surface area material may have high water adsorption properties because of pore surface functionalities.

The MOF may have a water uptake in weight percent that is increased as compared with conventionally used desiccant materials. The water uptake may be between 30% and 80% as a function of relative humidity, as compared with the water uptake in weight percent of conventionally used zeolite desiccant materials that is around 20%. The water adsorption capacity of the MOF is also greater than the adsorption capacity of conventional desiccant materials at low relative humidity. In an exemplary application in which a zeotropic refrigerant is used and water is separated from the refrigerant at room temperature and 300 psi, the adsorption capacity of the MOF may be between 19 and 28 mmol/g as compared with conventionally used zeolite desiccant materials which have an adsorption capacity that is around 9 mmol/g. The water uptake and adsorption capacity of the MOF may be adjustable by chemically tuning the MOF and may be selected for a particular application and refrigerant.

Figure 5A:
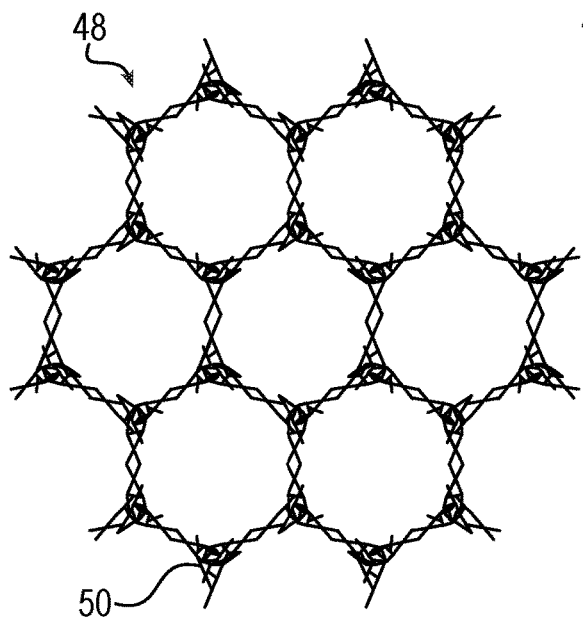
FIG. 5A is a drawing showing a topology of bridging ligands in an exemplary MOF structure that is in the form of MOF-74-M.
Figure 5B:
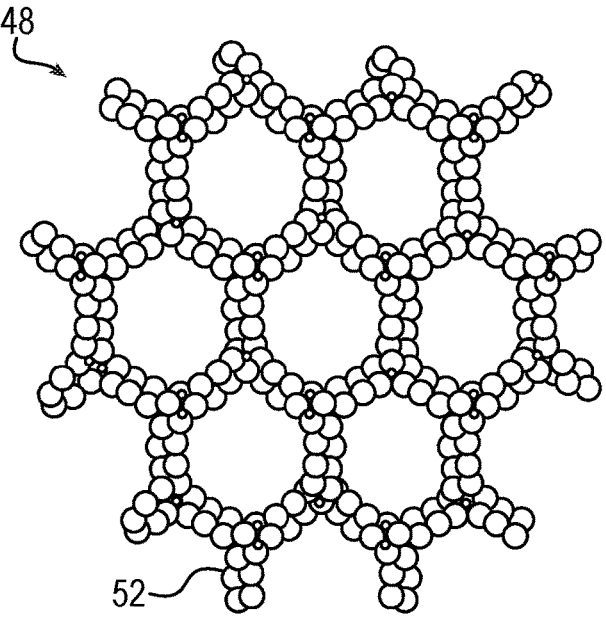
FIG. 5B is another drawing showing the MOF structure of FIG. 5A.
Figure 5C:
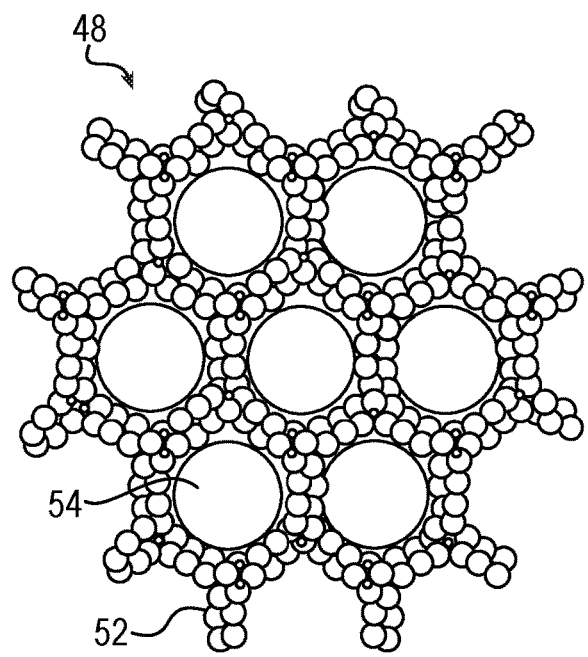
FIG. 5C is still another drawing showing the MOF structure of FIG. 5A.
Figure 5D:
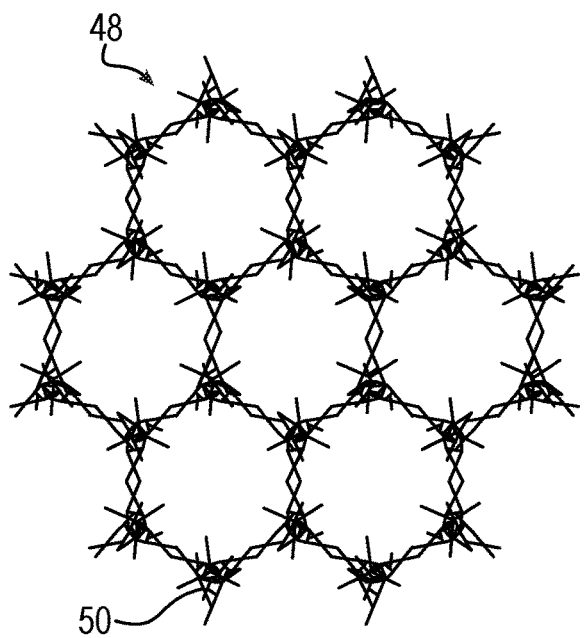
FIG. 5D is still another drawing showing the MOF structure of FIG. 5A.

With reference to FIGS. 5A-5D, the topology of an exemplary MOF-74 structure 48 including nickel is shown. FIGS. 5A and 5D show the bridging ligands 50 of the structure 48, and FIG. 5B shows the metal ions 52 of the structure 48. FIG. 5C additionally shows the pores 54 defined by the MOF-74 structure 48. The pores 54 may have similar sizes and be equidistantly spaced such that the MOF-74 structure has an ordered pattern. The MOF-74 structure 48 may have a surface area that is around 1100 $m^2/g$. In other MOF-74-Ms in which the M is cobalt, magnesium, or zinc, the surface areas may be approximately 1100 $m^2/g$, 1180 $m^2/g$, and 920 $m^2/g$, respectively. The MOF-74 structure 48 may have a water uptake in weight percent that is between approximately 35% and 45% as a function of relative humidity. In other MOF-74-Ms in which the M is cobalt, magnesium, or zinc, the water uptake may be between 30% and 40%, between 40% and 80%, and between 30% and 60%, respectively.

In an exemplary application in which a zeotropic refrigerant is used and water is separated from the zeotropic refrigerant at room temperature and a pressure of 300 psi, the adsorption capacity of the MOF-74 structure 48 may be between 19 and 20 mmol/g. If the MOF-74 structure 48 does not include a binder, the adsorption capacity may be between 19 and 19.5 mmol/g and if the MOF-74 structure 48 includes a 5% polyacrylic acid binder, the adsorption capacity may be slightly less than the capacity of the MOF-74 structure 48 that does not include the binder, approximately 19.3 mmol/g. In an MOF-74 that includes cobalt without a binder, the adsorption capacity may be between 25 and 28 mmol/g and if the MOF-74 includes cobalt with a 5% polyacrylic acid binder, the adsorption capacity may be slightly less than the capacity of the MOF-74 cobalt structure that does not include the binder, approximately 25.4 mmol/g. Using either nickel or cobalt in the MOF-74 material, with or without a binder, enables an adsorption capacity of the MOF desiccant material that is at least two times greater than the adsorption capacity of conventional zeolite desiccant materials.

Figure 6A:
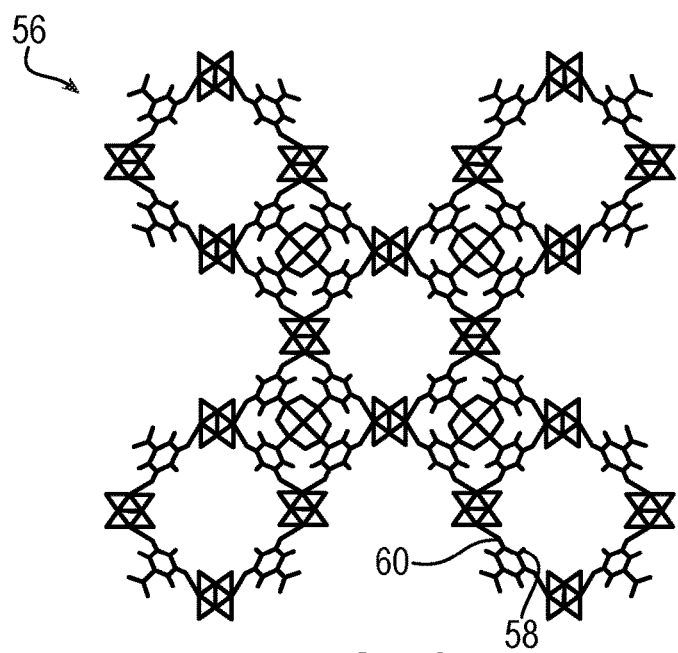
FIG. 6A is a drawing showing a topology of another exemplary MOF structure that is in the form of HKUST-1.
Figure 6B:
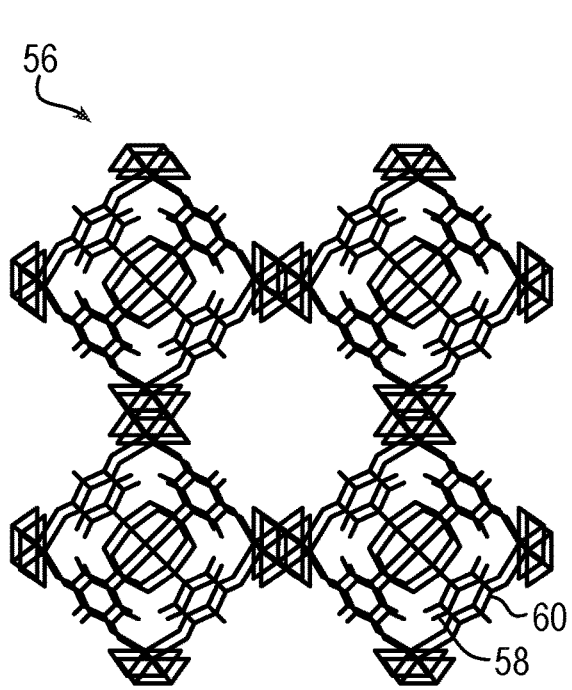
FIG. 6B is another drawing showing the MOF structure of FIG. 6A.
Figure 6C:
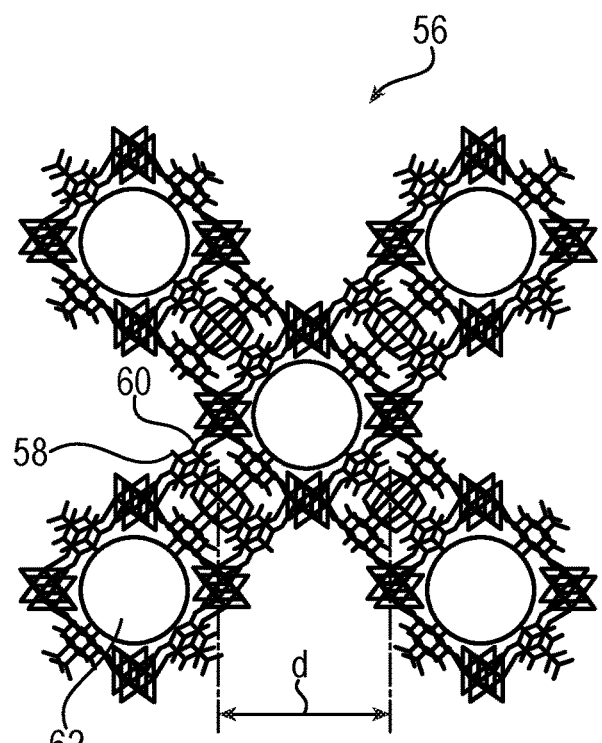
FIG. 6C is still another drawing showing the MOF structure of FIG. 6A.

With reference to FIGS. 6A-6C, the topology of an exemplary MOF structure 56 that is in the form of HKUST-1 is shown. FIGS. 6A-6C show the metal ions 58 and the bridging ligands 60 of the structure 56. FIG. 6C additionally shows the pores 62 defined by the HKUST-1 structure 56. In contrast to MOF-74, HKUST-1 may have pores with non-uniform sizes. In exemplary embodiments, HKUST-1 may have at least two sets of pores with different sizes that range between 4 and 10 angstroms. In exemplary embodiments, HKUST-1 may have at least three sets of differently sized pores. Due to the difference in sizes, the spacing between the pores may also vary. As shown in FIG. 6C, a distance d between similarly sized pores may be between 1 and 1.2 nanometers. The HKUST-1 may have surface areas that are greater than 1600 $m^2/g$. In an exemplary application in which a zeotropic refrigerant is used and water is separated from the refrigerant at room temperature and 300 psi, the adsorption capacity of the HKUST-1 structure 56 may be between 21 and 22 mmol/g.

Figure 7A:
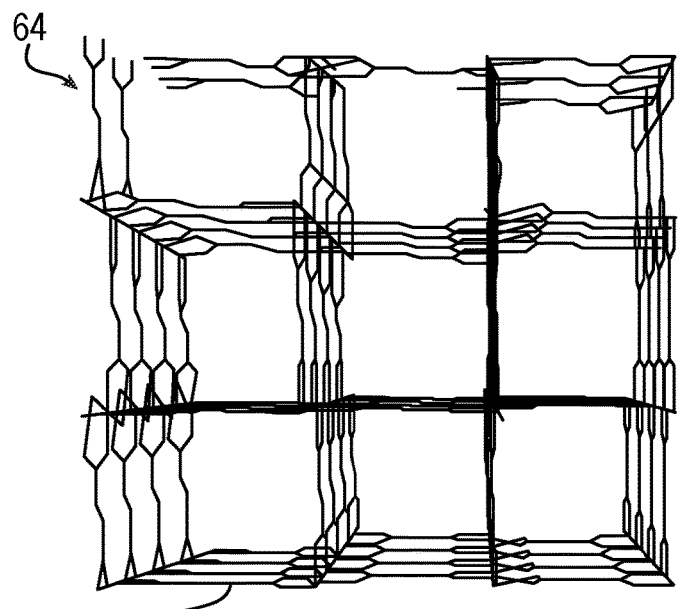
FIG. 7A is a drawing showing the topology of bridging ligands in another exemplary MOF structure that is in the form of aluminum fumarate.
Figure 7B:
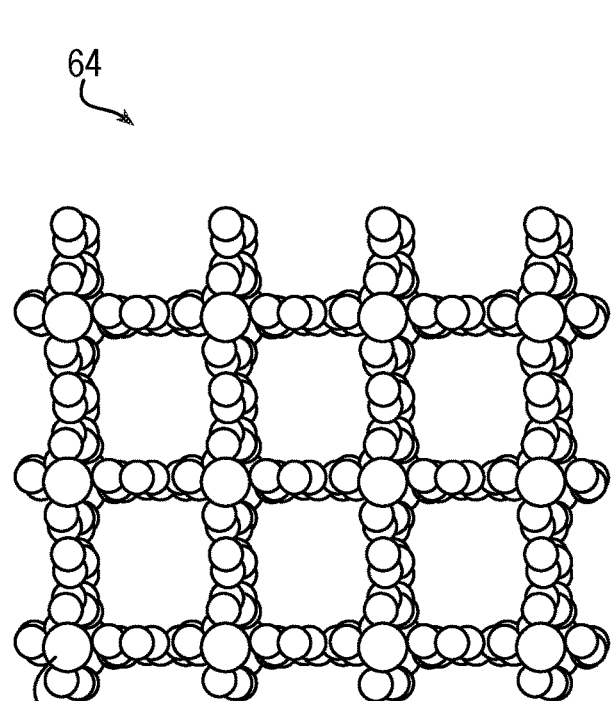
FIG. 7B is another drawing showing the MOF structure of FIG. 7A.
Figure 7C:
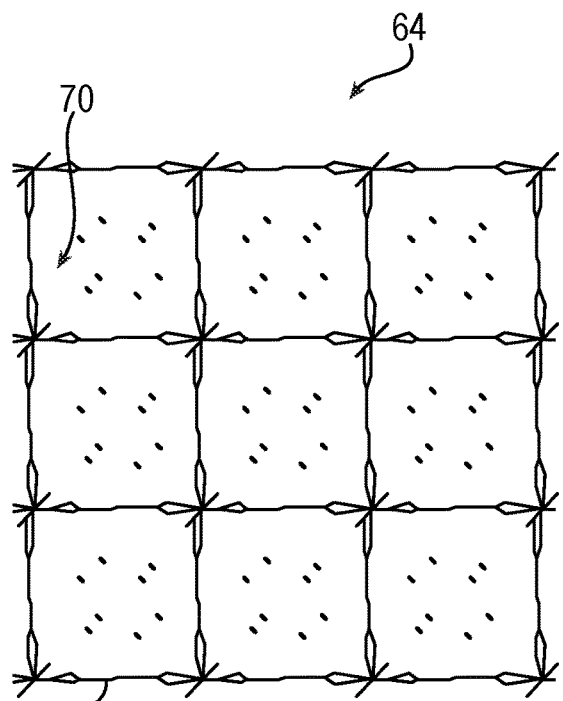
FIG. 7C is still another drawing showing the MOF structure of FIG. 7A.

With reference to FIGS. 7A-7C, the topology of an exemplary MOF structure 64 that is in the form of aluminum fumarate is shown. Using aluminum fumarate MOF is particularly advantageous for fluoride adsorption and removal. FIGS. 7A and 7C show the bridging ligands 66, and FIG. 7B shows the metal ions 68. The aluminum fumarate structure 64 defines square-shaped channels 70. The surface area of the aluminum fumarate structure 64 may be greater than 1100 $m^2/g$ and the pore sizes may be larger as compared with the pore sizes of HKUST-1 and MOF-74. For example, the pore sizes may be approximately 17 angstroms.

Figure 9:
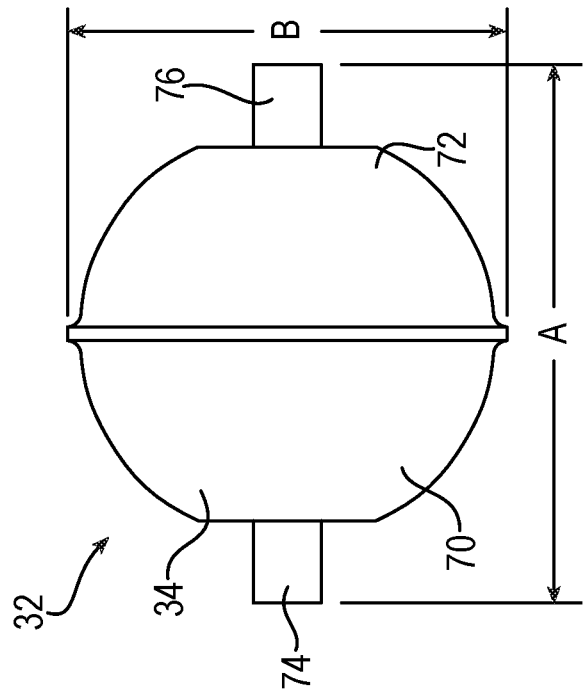
FIG. 9 is a drawing showing a sectional view of the exterior housing of FIG. 8.
Figure 8:
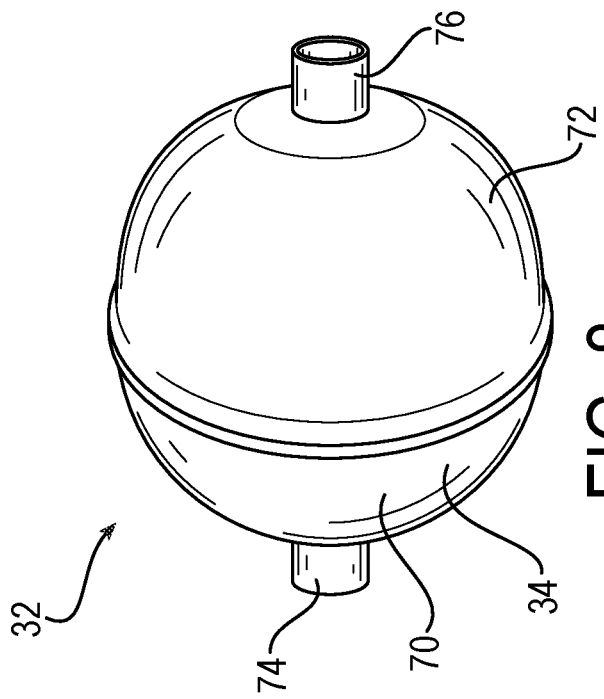
FIG. 8 is a drawing showing a perspective view of an exterior housing of an exemplary filter-drier unit.

Referring now to FIGS. 8 and 9, the exterior housing 34 of the filter-drier unit 32 is formed of a hard material and supports the desiccant material that is formed of the MOF material according to any of the aforementioned features. The filter-drier unit 32 may be suitable for use in applications having pressure of up to 650 psi, and the filter-drier unit 32 may be shaped to minimize a pressure drop. The filter-drier unit 32 may be suitable for use with lower pressure applications that are around 300 psi. The exterior housing 34 and the desiccant material housed within the exterior housing 34 are arranged to provide a minimal free internal volume defined between the exterior housing 34 and the desiccant material which advantageously reduces refrigerant filling in the filter-drier unit 32.

The exterior housing 34 may be formed of any suitable metal material such as copper, aluminum, steel, nickel, and any alloys thereof. Copper may be suitable for use in smaller systems that have less pressure fluctuations and lower vibration tendencies. The exterior housing 34 may additionally have any suitable paint for corrosion protection of the components. The exterior housing 34 is configured to be compact and may have any suitable shape such as cylindrical or spherical. In an exemplary embodiment, the exterior housing 34 may be formed of two hemispherical shells 70, 72 that are engageable with each other to enclose the exterior housing 34. The exterior housing 34 further includes metal joints 74, 76 that are arranged coaxially with each other and extend outwardly from the exterior housing 34. The metal joints 74, 76 may be brazed to the exterior housing 34 and in fluid communication with other components of the refrigerant loop 30 (shown in FIG. 1) for passing refrigerant through the filter-drier unit 32. As shown in FIG. 9, the exterior housing 34 has a lay-in length A and a body diameter B. The lay-in length A is the distance between the outermost ends of the metal joints 74, 76.

Using MOF as the desiccant material is advantageous in that the MOF enables improved efficiency of the filter-drier unit such that the overall size of the filter-drier unit 32 is reduced as compared with filter-driers using conventional desiccant materials. The size may be reduced by at least 20% such that the cost of manufacturing the filter-drier unit is also reduced. In an exemplary embodiment, the lay-in length A may be approximately 7.39 centimeters (2.91 inches) with the body diameter B being 5.66 centimeters (2.23 inches). In another exemplary embodiment, the lay-in length A may be approximately 8.59 centimeters (3.38 inches) with the body diameter B being 7.04 centimeters (2.77 inches). In still another exemplary embodiment, the lay-in length A may be approximately 10.1 centimeters (3.97 inches) with the body diameter B being 8.79 centimeters (3.46 inches). The aforementioned dimensions are merely exemplary and many other dimensions may be suitable.

Using the MOF may also result in reduced overall weight of the filter-drier unit 32 by up to 40% as compared with the weight of filter-driers using conventional desiccant materials. For example, the MOF desiccant material may have a weight that is between 30 and 40 grams as compared with the weight of conventional desiccants that may be around 42 grams. The efficiency of the MOF may also result in the filter-drier unit 32 being formed of fewer parts as compared with conventional filter-drier units. For example, metal joints, fittings, welded cooling fixtures, and the epoxy paint used for corrosion protection may be either reduced or eliminated.

Figure 10:
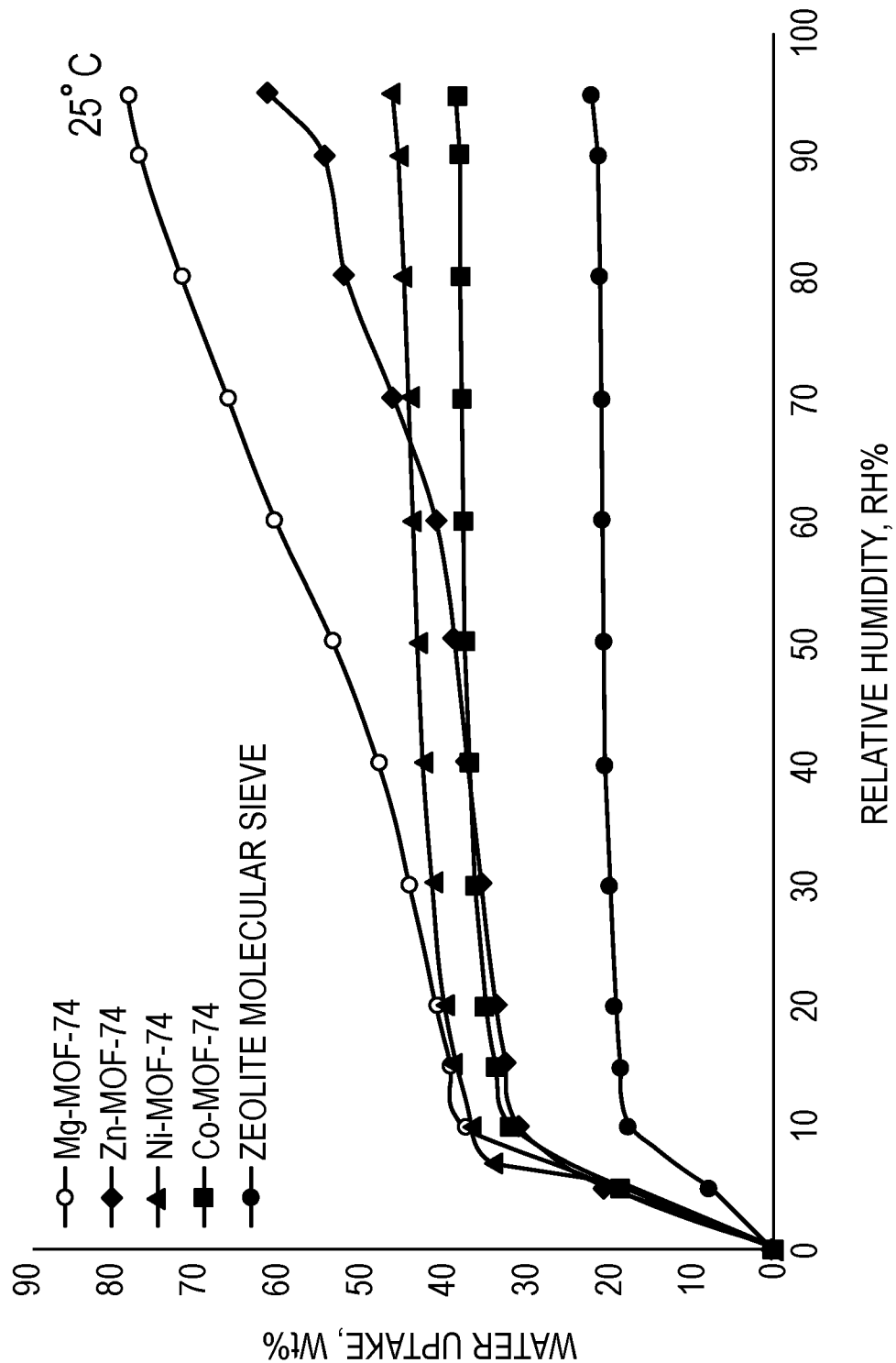
FIG. 10. is a drawing showing a graph of adsorption of water as a function of relative humidity in representative MOF materials and zeolite molecular sieve.
Figure 11:
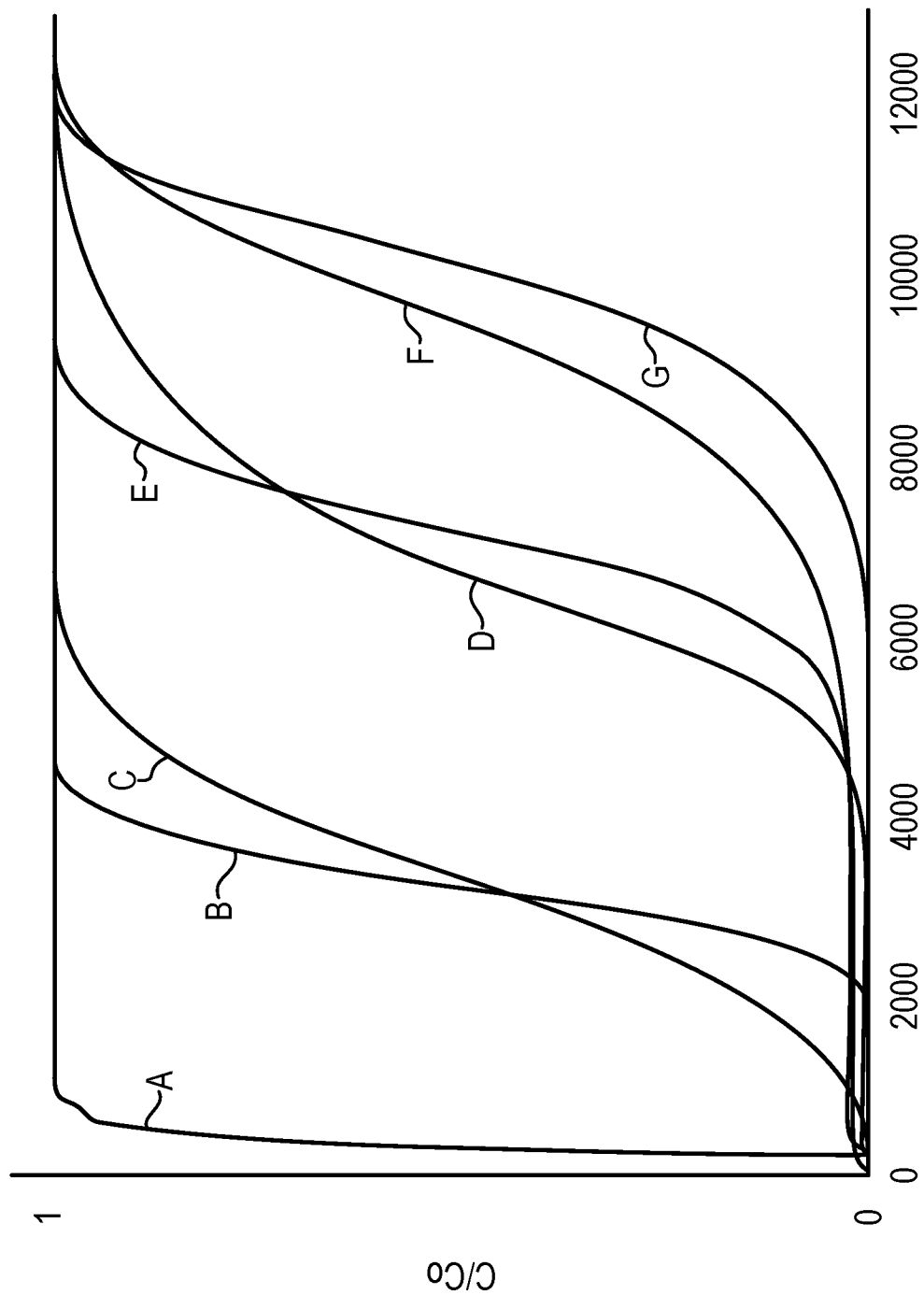
FIG. 11 is a drawing showing a graph of adsorption of water in a refrigerant using different MOF materials as desiccants as compared with conventional desiccant materials.
Figure 12:
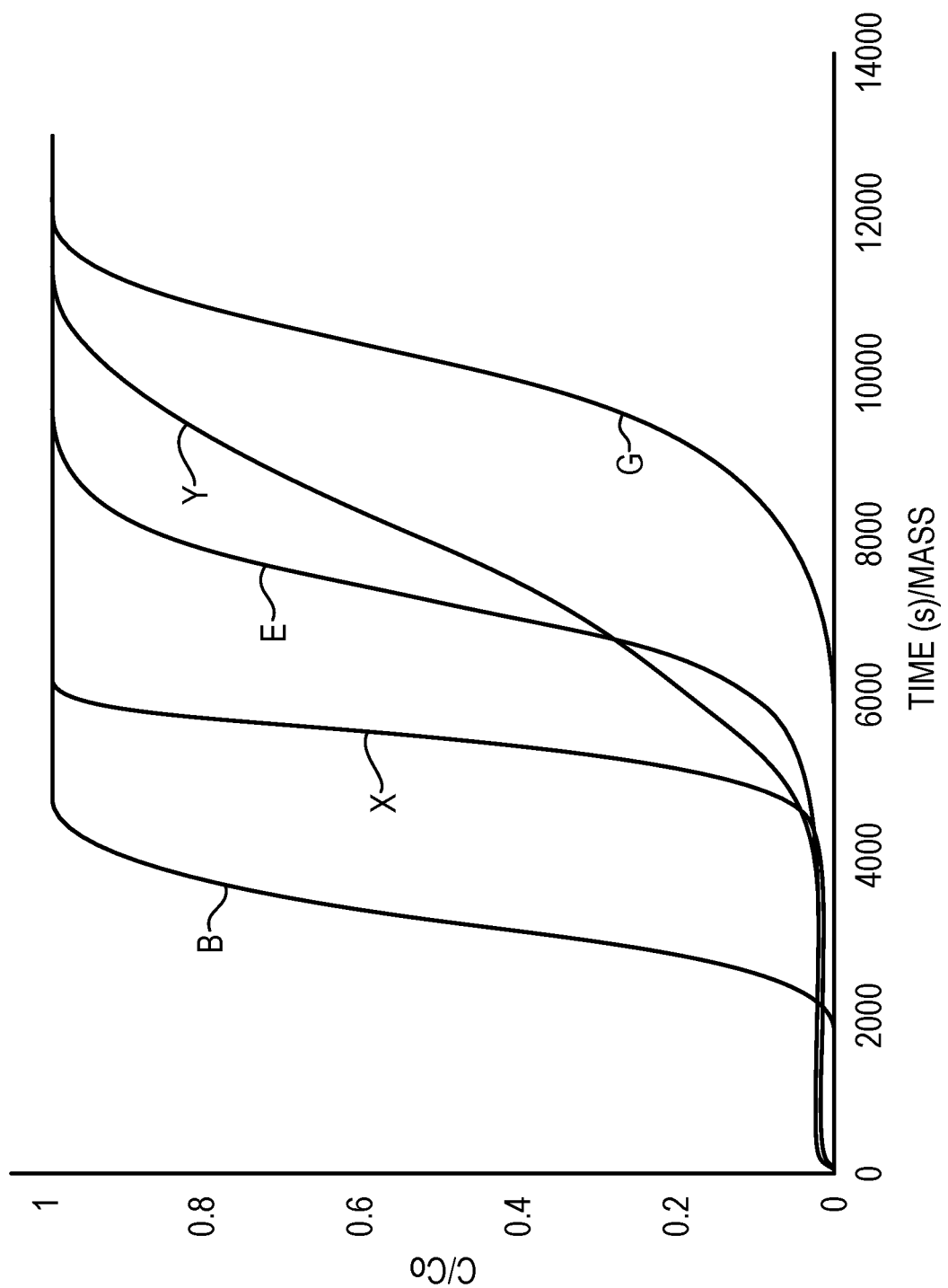
FIG. 12 is a drawing showing another graph of adsorption of water in a refrigerant using different MOF materials.

Advantages in drying using MOF as the desiccant material is shown graphically in FIGS. 10-12. FIG. 10 shows the water adsorption isotherm of representative MOF material MOF-74-M (M=Mg, Zn, Ni, Co) and zeolite molecular sieve 3A. The isotherm data indicates that MOF materials have significantly higher water capacity than conventional 3A molecular sieve. FIGS. 11 and 12 represent the measurement of adsorption capacity of selected MOF materials and conventional zeolite molecular sieves in a breakthrough setup. The experiment was conducted by passing a given amount of water-refrigerant mixture through an adsorbent bed with a fixed amount of material at a given flow rate. The adsorption capacity is determined for water in R-410A zeotropic refrigerant at room temperature and 300 psi. The breakthrough time of the water was monitored. Longer breakthrough times resulted in better moisture adsorption capacity of the given adsorbent.

FIG. 11 shows the adsorption capacity of conventional and previously used desiccant materials A, B, C which correspond to a conventional glass bead material, 3A molecular sieve, and 4A molecular sieve, respectively, and the adsorption capacity of MOF desiccant materials, D, E, F, G which correspond to an Ni-MOF-74 material with 5% polyacrylic acid binder, an Ni-MOF-74 material, a Co-MOF-74 material with 5% polyacrylic acid binder, and a Co-MOF-74 material, respectively. As shown in FIG. 11, the MOF desiccant materials D, E, F, G have improved adsorption rates of 19.3 mmol/g, 19.5 mmol/g, 25.4 mmol/g, and 27.6 mmol/g, respectively, as compared with the adsorption rates of the conventional desiccants A, B, C that are less than 10 mmol/g. As also shown in FIG. 11, the adsorption capacity may be slightly improved without including the binder material.

FIG. 12 shows an end result of drying using the same conditions as in FIG. 11. FIG. 12 shows the adsorption capacities of conventional desiccant materials B (3A molecular sieve) and X, which corresponds to 13X molecular sieve, as compared with those of MOF materials E, (Ni-MOF-74 material), G (Co-MOF-74 material), and Y, which corresponds to an HKUST-1 material. As shown in FIG. 11, the MOF desiccant materials E, G, and Y have improved adsorption rates of 19.3 mmol/g, 25.4 mmol/g, and 21.3 mmol/g, respectively, as compared with the adsorption rates of the conventional desiccant B and X which are 9 mmol/g and 14.8 mmol/g, respectively. Accordingly, the adsorption capacity of the desiccant using a MOF material as described herein may be improved by over twice as much as compared with conventional desiccant materials.

Figure 13:
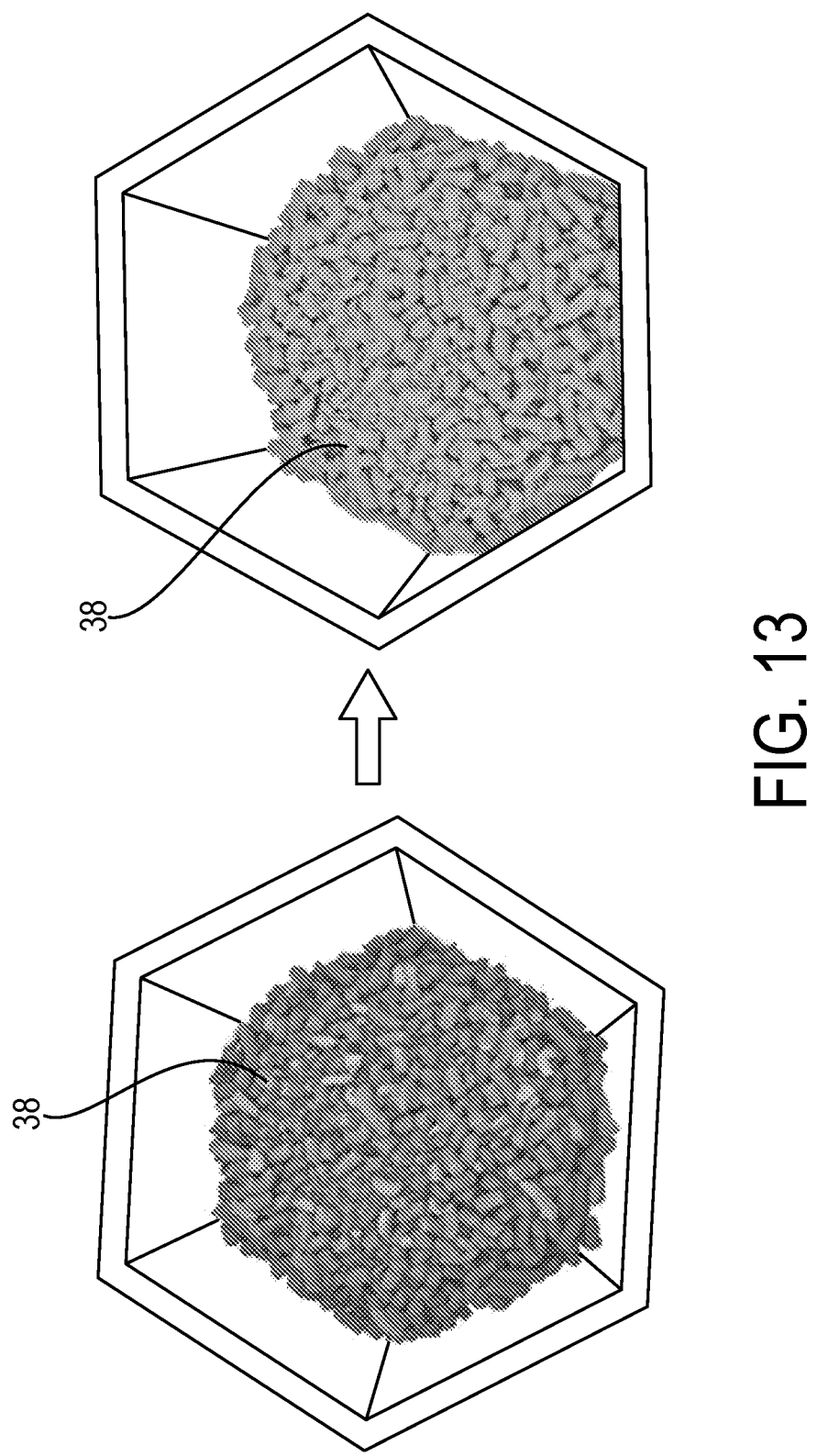
FIG. 13 is a drawing showing the color change of a copper-based MOF upon adsorption of water.

FIG. 13 shows a color change ability of MOF material, such as a copper-based MOF or HKUST-1 upon adsorption of water. The MOF material may be formed as pellets 38 used for the desiccant material 36 shown in FIGS. 2 and 3. The color-changing property is advantageous in filter-drier applications in which the color change can be used as an indicator of filter-drier lifecycle or as a humidity sensor. In an exemplary embodiment, the color change may be constituted by a change from a darker shade to a lighter shade or vice versa. For example, the color change may be between a darker shade of blue and a lighter shade of blue or a teal or greenish blue.

A filter-drier unit for a refrigerant or dehumidification of air includes an exterior housing formed of a hard material, and a desiccant material supported within the exterior housing and being formed of a metal-organic framework material having inorganic metal ions and bridging ligands that link the metal ions. The metal-organic framework has a three-dimensional permanently porous structure that has at least one chemically tunable characteristic.

The desiccant material may be formed of at least one of a molded core material, a monolith material, or a loose-bead form material.

The at least one chemically tunable characteristic may include at least one of pore size, pore volume, and surface area.

The metal-organic framework material may be formed of bead-shaped or pellet-shaped bodies that are packed together.

The metal-organic framework material may have a surface area that is greater than 500 $m^2/g$.

The metal-organic framework material may have a pore size ranging from 0.3 to 10 nanometers.

The metal-organic framework may be a MOF-74-M material where M is nickel, cobalt, copper, zinc, manganese, zirconium, or magnesium.

The metal-organic framework is a MBTC material where M is a transition metal and BTC is tricarboxylate.

The metal-organic framework may be an aluminum fumarate material.

The metal-organic framework may be a UiO-66 material.

The inorganic metal ions or the bridging ligands may be formed of mixed metal materials.

The mixed metal materials may include divalent, trivalent, or tetravalent metals ions.

The trivalent metal ions may include at least one of aluminum, chromium, vanadium, and rare earth metals.

The tetravalent metal ions may include at least one of zirconium, titanium, and hafnium.

The metal-organic framework may be functionalized with a polar group.

The filter-drier unit may include a binder material.

The desiccant material may include an alumina material blended with the metal-organic framework material.

The exterior housing may include a metal material that is at least one of copper, aluminum, steel, nickel, and any alloys thereof.

The exterior housing may have an outer diameter that is between 3 and 9 centimeters and the filter-drier unit may have a length between 7 and 11 centimeters.

The filter-drier unit may be arranged along a refrigeration loop downstream from a compressor.

The desiccant material may be a desiccant wheel.

A method of forming a filter-drier unit for a refrigerant in a refrigeration loop may include providing an exterior housing formed of a hard material, forming a desiccant material of a metal-organic framework material having inorganic metal ions and bridging ligands that link the metal ions, with the metal-organic framework having a three-dimensional permanently porous structure, and arranging the desiccant material within the exterior housing.

The method may include selecting a predetermined characteristic of the desiccant material that is at least one of surface area, pore volume, particle size distribution, density, compressibility, stiffness, strength, thermal expansion, thermal conductivity, and water adsorption capacity, and chemically tuning the three-dimensional porous structure to obtain the characteristic.

Chemically tuning the pore volume includes replacing or modifying at least one of the bridging ligands.

The method may include forming a plurality of pellet-shaped or bead-shaped bodies of the metal-organic framework using a manufacturing process that is as least one of pressing, compounding, pelletization, tableting, extrusion, coextrusion, foaming, spinning, coating, wet granulation, spraying, spray drying or any combination thereof.

The method may include forming the porous structure to have a surface area that is greater than 50 $m^2/g$ and a plurality of pores having sizes ranging from 0.3 to 10 nanometers.

The method may include selecting the metal-organic framework material to be one of a MOF-74-M material, an HKUST-1 material, a UiO-66 material, an aluminum fumarate material, or a mixed metal material that includes divalent, trivalent, or tetravalent metals ions.

The method may include blending the metal-organic framework material with alumina.

The method may include arranging the filter-drier unit to be configured along a refrigeration loop and downstream of a compressor of the refrigeration loop.

A method of filtering a refrigerant in a refrigeration loop may include passing at least a portion of a mixed stream of the refrigerant and other media over a desiccant material formed of a metal-organic framework material having a three-dimensional permanently porous structure, wherein the metal-organic framework material is one of a MOF-74-M material, an HKUST-1 material, a UiO-66 material, an aluminum fumarate material, or a mixed-metal material that includes divalent, trivalent, or tetravalent metals ions, and capturing a predetermined medium from the mixed stream to separate the medium from the refrigerant using the desiccant material.

The method may include capturing the predetermined medium from the mixed stream includes capturing water.

The method may include using a color change of the metal-organic framework material as an indicator of adsorption.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter-drier unit for a refrigerant drying or dehumidification of air, the filter-drier unit comprising:
   an exterior housing; and
   a desiccant material supported within the exterior housing and being formed of a metal-organic framework material having inorganic metal ions and bridging ligands that link the metal ions, wherein the metal-organic framework material has a three-dimensional permanently porous structure that has at least one chemically tunable characteristic, the at least one chemically tunable characteristic including at least one of pore size, pore volume, and surface area;
   wherein the metal-organic framework material is in a three-dimensional molded core form, wherein prior to the metal-organic framework material being in the three-dimensional molded core form, the metal-organic framework material is in a beaded or granulated form that is subsequently formed into the three-dimensional molded core form using a binder material;
   wherein the metal-organic framework material is a MOF-74-M material, an HKUST-1 material, a UiO-66 material, an MBTC material, or an aluminum fumarate material; and
   wherein the desiccant material further includes an alumina material blended with the metal-organic framework material.

2. The filter-drier unit according to claim 1, wherein the metal-organic framework material has a surface area that is greater than 500 $m^2/g$.

3. The filter-drier unit according to claim 1 wherein the metal-organic framework material has a pore size ranging from 0.3 to 10 nanometers.

4. The filter-drier unit according to claim 1, wherein the metal-organic framework is the MOF-74-M material where M is nickel, cobalt, copper, zinc, manganese, zirconium, or magnesium.

5. The filter-drier unit according to claim 1, wherein the metal-organic framework is the MBTC material where M is a transition metal and BTC is tricarboxylate.

6. The filter-drier unit according to claim 1, wherein the inorganic metal ions are formed of mixed metal materials that include divalent, trivalent, or tetravalent metals ions.

7. The filter-drier unit according to claim 6, wherein the trivalent metal ions include at least one of aluminum, chromium, vanadium, and rare earth metals.

8. The filter-drier unit according to claim 6, wherein the tetravalent metal ions include at least one of zirconium, titanium, and hafnium.

9. The filter-drier unit according to claim 1, wherein the metal-organic framework is functionalized with a polar group.

10. The filter-drier unit according to claim 1, wherein the exterior housing includes a metal material that is at least one of copper, aluminum, steel, nickel, and any alloys thereof.

11. The filter-drier unit according to claim 1, wherein the exterior housing has an outer diameter that is between 3 and 9 centimeters and the filter-drier unit has a length between 7 and 11 centimeters.

12. The filter-drier unit according to claim 1, wherein the filter-drier unit is arranged along a refrigeration loop downstream from a compressor.

13. The filter-drier unit according to claim 1, wherein the desiccant material is a desiccant wheel.

14. A method of forming a filter-drier unit for a refrigerant in a refrigeration loop or dehumidification of air, the method comprising:
providing an exterior housing;
forming a desiccant material of an alumina material blended with a metal-organic framework material having inorganic metal ions and bridging ligands that link the metal ions, wherein the metal-organic framework material has a three-dimensional permanently porous structure, wherein the metal-organic framework material is in a three-dimensional molded core form, wherein prior to the metal-organic framework material being in the three-dimensional molded core form, the metal-organic framework material is in a beaded or granulated form that is subsequently formed into the three-dimensional molded core form using a binder material, wherein the metal-organic framework material is a MOF-74-M material, an HKUST-1 material, a UiO-66 material, an MBTC material, or an aluminum fumarate material;
chemically tuning a predetermined characteristic of the three-dimensional porous structure, the predetermined characteristic including at least one of pore size, pore volume, and surface area; and
arranging the desiccant material within the exterior housing.

15. The method according to claim 14 further comprising adjusting a predetermined characteristic of the desiccant material that is at least one of particle size distribution, density, compressibility, stiffness, strength, thermal expansion, and thermal conductivity.

16. The method according to claim 14 further comprising forming a plurality of pellet-shaped or bead-shaped bodies of the metal-organic framework using a manufacturing process that is as least one of pressing, compounding, pelletization, tableting, extrusion, coextrusion, foaming, spinning, coating, wet granulation, spraying, spray drying or any combination thereof.

17. A filter-drier unit for a refrigerant drying or dehumidification of air, the filter-drier unit comprising:
an exterior housing; and
a desiccant material supported within the exterior housing and being formed of a metal-organic framework material having inorganic metal ions and bridging ligands that link the metal ions, wherein the metal-organic framework material has a three-dimensional permanently porous structure that has at least one chemically tunable characteristic, the at least one chemically tunable characteristic including at least one of pore size, pore volume, and surface area;
wherein the metal-organic framework material is in a three-dimensional molded core form, wherein prior to the metal-organic framework material being in the three-dimensional molded core form, the metal-organic framework material is in a beaded or granulated form that is subsequently formed into the three-dimensional molded core form using a binder material;
wherein the metal-organic framework is a MOF-74-M material where M is nickel, cobalt, copper, zinc, manganese, zirconium, or magnesium.

18. The filter-drier unit according to claim 17, wherein the metal-organic framework material has a surface area that is greater than 500 $m^2/g$.

19. The filter-drier unit according to claim 17, wherein the metal-organic framework material has a pore size ranging from 0.3 to 10 nanometers.

20. The filter-drier unit according to claim 17, wherein the inorganic metal ions are formed of mixed metal materials that include divalent, trivalent, or tetravalent metal ions.

* * * * *